United States Patent
Pass

(10) Patent No.: US 10,413,760 B2
(45) Date of Patent: Sep. 17, 2019

(54) MOUNTING BRACKET FOR FALL ARREST DEVICE

(71) Applicant: Latchways Plc, Devizes (GB)

(72) Inventor: Andrew Pass, Devizes (GB)

(73) Assignee: Latchways Plc, Wiltshire (GB)

( * ) Notice: Subject to any disclaimer, the term of this patent is extended or adjusted under 35 U.S.C. 154(b) by 0 days.

(21) Appl. No.: 15/550,052

(22) PCT Filed: Feb. 12, 2016

(86) PCT No.: PCT/GB2016/050339
§ 371 (c)(1),
(2) Date: Aug. 10, 2017

(87) PCT Pub. No.: WO2016/128759
PCT Pub. Date: Aug. 18, 2016

(65) Prior Publication Data
US 2018/0028848 A1    Feb. 1, 2018

(30) Foreign Application Priority Data
Feb. 13, 2015    (GB) .................................... 1502502.6

(51) Int. Cl.
*A62B 35/00*    (2006.01)
*F16B 5/02*    (2006.01)
*F16B 2/12*    (2006.01)

(52) U.S. Cl.
CPC ...... *A62B 35/0068* (2013.01); *A62B 35/0093* (2013.01); *F16B 2/12* (2013.01); *F16B 5/02* (2013.01); *F16B 5/0233* (2013.01); *F16B 5/0258* (2013.01)

(58) Field of Classification Search
CPC ... A62B 35/0068; A62B 35/0093; F16B 2/12; F16B 5/0233
See application file for complete search history.

(56) References Cited

U.S. PATENT DOCUMENTS

| 2,598,596 | A | * | 5/1952 | Petrie | ..................... A47G 25/02 242/379.2 |
| 3,948,488 | A |  | 4/1976 | Brockelsby | |
| 4,699,245 | A | * | 10/1987 | Benedet | ............. E04G 21/3295 182/3 |
| 5,011,106 | A | * | 4/1991 | Cody | ................. A62B 35/0068 182/3 |
| 5,054,576 | A | * | 10/1991 | Glynn | .................... A62B 35/04 182/3 |
| 5,287,944 | A | * | 2/1994 | Woodyard | ............. A62B 35/04 182/3 |

(Continued)

FOREIGN PATENT DOCUMENTS

| CN | 201840793 U | 5/2011 |
| DE | 102010031208 A1 | 1/2012 |

(Continued)

*Primary Examiner* — Anita M King
(74) *Attorney, Agent, or Firm* — The Webb Law Firm

(57) ABSTRACT

A mounting bracket for securing a fall arrest device to a structure, the mounting bracket including a base plate configured for attachment to a structure, and at least one device mounting arrangement attached to or integral with the base plate and configured to secure the fall arrest device to the mounting bracket.

16 Claims, 3 Drawing Sheets

(56) References Cited

U.S. PATENT DOCUMENTS

| | | | |
|---|---|---|---|
| 5,348,117 A * | 9/1994 | Pickering | A62B 1/08 |
| | | | 182/236 |
| 7,364,016 B2 * | 4/2008 | Drummond | A62B 1/04 |
| | | | 182/3 |
| 2005/0034920 A1 | 2/2005 | Anderson | |
| 2005/0161285 A1 | 7/2005 | Blackford et al. | |
| 2007/0017740 A1 * | 1/2007 | Geens | A62B 35/0056 |
| | | | 182/3 |
| 2009/0211849 A1 | 8/2009 | Smith et al. | |
| 2012/0153090 A1 | 6/2012 | Schindler et al. | |
| 2013/0105251 A1 | 5/2013 | Baum | |
| 2017/0050060 A1 * | 2/2017 | Wolter | A62B 35/0056 |

FOREIGN PATENT DOCUMENTS

| | | |
|---|---|---|
| FR | 2888298 A1 | 1/2007 |
| NL | 1008313 C2 | 8/1999 |
| WO | 2012004033 A1 | 1/2012 |

\* cited by examiner

MOUNTING BRACKET FOR FALL ARREST DEVICE

CROSS REFERENCE TO RELATED APPLICATIONS

This application is the United States national phase of International Application No. PCT/GB2016/050339 filed Feb. 12, 2016, and claims priority to United Kingdom Patent Application No. 1502502.6 filed Feb. 13, 2015, the disclosures of which are hereby incorporated in their entirety by reference.

BACKGROUND OF THE INVENTION

Field of the Invention

The present invention relates generally to a fall arrest system, and, in particular to a mounting bracket for a fall arrest device to retain the fall arrest device on or adjacent a structure.

Description of the Related Art

Fall arrest systems and devices, e.g., self-retracting lanyards, are used to prevent personnel working at heights from suffering injury as a result of falling or other such events. Fall arrest systems are often referred to as height safety systems or fall protection systems. In order to effectively use such a fall arrest device, it must be effectively secured to some immovable structure, such as a building, a railing, an embedded connection point, and the like. Accordingly, in the event of a fall, the fall arrest device, which includes a safety line with a removable connector, e.g., a carabiner, attached to the user's harness, brakes or arrests the user's fall using the connection point to ensure that the fall arrest device does not move.

There is a need in the art for improved methods and arrangements for securely mounting the fall arrest device to a structure, such as, but not limited to, towers, derricks, drilling rigs, cranes, and the like. Further, there is a need in the art for improved methods and arrangements that facilitate the secure attachment of the fall arrest device to the structure, which enables the simple and effective attachment and release of the fall arrest device to the connection point. Still further, there is a need in the art for improved methods and arrangements that provide the ability to replace and/or repair the fall arrest device. For example, there is a need for an improved mounting bracket for a fall arrest device for attaching or securing the fall arrest device to a structure, such as a derrick or drilling rig, which may be in the form of mobile units, where the mounting bracket is configured to maintain the fall arrest device when the derrick or drilling rig is lowered and stowed for transportation.

SUMMARY OF THE INVENTION

Accordingly and generally, provided is an improved mounting bracket for a fall arrest device.

According to one preferred and non-limiting embodiment or aspect, provided is a mounting bracket for securing a fall arrest device to a structure, the mounting bracket comprising: a base plate configured for attachment to a structure; and at least one device mounting arrangement attached to or integral with the base plate and configured to secure the fall arrest device to the mounting bracket.

In one preferred and non-limiting embodiment or aspect, the at least one device mounting arrangement comprises a mounting element attached to or integral with the base plate, wherein the mounting element comprises at least one attachment arrangement configured to removably attach the fall arrest device to the mounting bracket. In another preferred and non-limiting embodiment or aspect, the attachment arrangement comprises at least one aperture extending through the mounting element and configured to receive at least one attachment member therethrough, the at least one attachment member configured to interact with at least one receiving hole extending at least partially in to at least a portion of the fall arrest device.

In one preferred and non-limiting embodiment or aspect, the at least one attachment member comprises a threaded bolt and the at least one receiving hole comprises an internal threaded surface configured to interact and mate with the threaded bolt, a head of the bolt bearing against at least a portion of an area surrounding the at least one aperture. In another preferred and non-limiting embodiment or aspect, the mounting bracket further comprises a plurality of apertures and a corresponding plurality of attachment members configured for insertion through a respective aperture. In a further preferred and non-limiting embodiment or aspect, the mounting element extends from an upper portion of the base plate, such that when the fall arrest device is attached thereto, wherein the fall arrest device is suspended from the mounting element.

In one preferred and non-limiting embodiment or aspect, the at least one mounting arrangement comprises a mounting element having a central opening configured to receive at least a portion of the fall arrest device therethrough. In another preferred and non-limiting embodiment or aspect, the mounting element comprises at least one aperture extending through the mounting element and configured to receive at least one attachment member therethrough, the at least one attachment member configured to interact with at least one receiving hole extending at least partially in to a first end of at least one spacer member.

In one preferred and non-limiting embodiment or aspect, the at least one attachment member comprises a threaded bolt and the at least one receiving hole comprises an internal threaded surface configured to interact and mate with the threaded bolt, a head of the bolt bearing against at least a portion of an area surrounding the at least one aperture. In another preferred and non-limiting embodiment or aspect, the mounting bracket further comprises a plurality of apertures and a corresponding plurality of attachment members configured for insertion through a respective aperture and in to a corresponding plurality of receiving holes extending at least partially in to a first end of a respective one of a plurality of spacer members.

In one preferred and non-limiting embodiment or aspect, the mounting bracket further comprises at least one receiving hole extending at least partially in a second end of the at least one spacer member, wherein at least one attachment member is configured to extend through at least one aperture extending through the base plate, wherein the at least one attachment member directly or indirectly connects the at least one spacer member to the base plate. In another preferred and non-limiting embodiment or aspect, the at least one attachment member is configured to extend through an aperture extending through the structure, wherein the at least one attachment member connects the at least one spacer member, the base plate, and the structure. In another preferred and non-limiting embodiment or aspect, the mounting bracket further comprises a plurality of spacer members configured to space the mounting element from the base plate.

In one preferred and non-limiting embodiment or aspect, the central opening is substantially circular and configured to at least partially receive a corresponding substantially circular portion of the fall arrest device therethrough.

In one preferred and non-limiting embodiment or aspect, the mounting bracket further comprises at least one bushing member attached to or fitted with the central opening and configured to contact at least a portion of the fall arrest device and reduce vibration of the fall arrest device during operation. In another preferred and non-limiting embodiment or aspect, at least one bushing member extends around a perimeter of the central opening. In another preferred and non-limiting embodiment or aspect, the at least one bushing member is at least partially formed from at least one of the following: a deformable material, a rubber material, a foam material, a vibration-absorbing material, a damping material, a resilient material, a plastic material, or any combination thereof.

In one preferred and non-limiting embodiment or aspect, the mounting bracket further comprises a retainer area configured to at least partially retain a connector of the fall arrest device with respect to the mounting bracket. In another preferred and non-limiting embodiment or aspect, the retainer area comprises an opening extending through at least a portion of the mounting bracket, the opening sized and shaped so as to removably retain the connector.

In one preferred and non-limiting embodiment or aspect, the at least one device mounting arrangement comprises: a first mounting element attached to or integral with the base plate, wherein the first mounting element comprises at least one attachment arrangement configured to removably attach the fall arrest device to the mounting bracket; and a second mounting element having a central opening configured to receive at least a portion of the fall arrest device therethrough.

According to one preferred and non-limiting embodiment or aspect, provided is a mounting bracket for securing a fall arrest device to a structure, the mounting bracket comprising at least one device mounting arrangement directly or indirectly attached to or integral with the structure and configured to secure the fall arrest device to the mounting bracket.

According to one preferred and non-limiting embodiment or aspect, provided is a bracket for securing a fall arrest device to a structure, the bracket comprising a first securing element for securing the fall arrest device with respect to the bracket in a first direction and a second securing element for securing the fall arrest device with respect to the bracket in a second direction.

In one preferred and non-limiting embodiment or aspect, the first securing element comprises a suspension securing arrangement which is arranged to be positioned above the fall arrest device and retain it in place in the first direction.

In one preferred and non-limiting embodiment or aspect, the second securing element comprises a front retainer element arranged to be spaced from the structure and extend adjacent to the fall arrest device to retain it in place in the second direction. In another preferred and non-limiting embodiment or aspect, the front retainer element is spaced from a rear portion of the bracket that is attached to the structure. In a further preferred and non-limiting embodiment or aspect, the front retainer element is arranged to engage with the fall arrest device in order to assist in holding the fall arrest device in place in the second direction. In another preferred and non-limiting embodiment or aspect, the front retainer element has an opening which is arranged to engage with the fall arrest device to assist in holding it in place. In a further preferred and non-limiting embodiment or aspect, the front retainer element includes a resilient engagement element arranged to engage with the fall arrest device to assist it in holding in place.

In one preferred and non-limiting embodiment or aspect, the front retainer element comprises an annular element defining a substantially circular opening. In one preferred and non-limiting embodiment or aspect, the front retainer element is provided with an opening for connecting a connector of a safety line of the fall arrest device to the bracket.

In one preferred and non-limiting embodiment or aspect, the bracket includes a base element having at least one aperture therein for securing the bracket to the structure, a front retainer element provided with apertures therein, and a plurality of spacer struts for spacing the front retainer element from the base element; wherein, when assembled, respective apertures in the base element and the front retainer element are aligned coaxially with the struts, such that the base element, the front retainer element, and the spacer struts can be secured together by a plurality of bolts secured into opposed ends of respective spacer struts.

According to one preferred and non-limiting embodiment or aspect, provided is a bracket for securing a fall arrest device to a structure, the bracket comprising a base element configured to be secured to a structure and a front retainer element spaced from the base element, the front retainer element comprising: a perimeter defining an aperture and configured to abut or engage a housing of the fall arrest device; a resilient element positioned around the perimeter; and an aperture for connecting a connector of a safety line of the fall arrest device to the bracket.

In one preferred and non-limiting embodiment or aspect, the aperture in the front retainer element further comprises an annular opening that is substantially circular. In another preferred and non-limiting embodiment or aspect, the resilient element is configured to abut or engage a housing of the fall arrest device.

According to one preferred and non-limiting embodiment or aspect, provided is a bracket for securing a fall arrest device to a structure, the bracket comprising a base element configured to be secured to a structure and a front retainer element spaced from the base element, wherein the base element comprises apertures, and the front retainer element comprises apertures and a plurality of spacer struts for spacing the front retainer element from the base element; and wherein, when assembled, the apertures in the base element and front retainer element are aligned coaxially with the spacer struts, such that they can be secured into opposing ends of respective spacer struts by a plurality of bolts.

According to one preferred and non-limiting embodiment or aspect, provided is a fall arrest system, comprising: a bracket as described above; and a fall arrest device.

Further embodiments or aspects will now be described in the following numbered clauses.

Clause 1: A mounting bracket for securing a fall arrest device to a structure, the mounting bracket comprising: a base plate configured for attachment to a structure; and at least one device mounting arrangement attached to or integral with the base plate and configured to secure the fall arrest device to the mounting bracket.

Clause 2: The mounting bracket of clause 1, wherein the at least one device mounting arrangement comprises a mounting element attached to or integral with the base plate, wherein the mounting element comprises at least one attachment arrangement configured to removably attach the fall arrest device to the mounting bracket.

Clause 3: The mounting bracket of clause 1 or 2, wherein the attachment arrangement comprises at least one aperture extending through the mounting element and configured to receive at least one attachment member therethrough, the at least one attachment member configured to interact with at least one receiving hole extending at least partially in to at least a portion of the fall arrest device.

Clause 4: The mounting bracket of any of clauses 1-3, wherein the at least one attachment member comprises a threaded bolt and the at least one receiving hole comprises an internal threaded surface configured to interact and mate with the threaded bolt, a head of the bolt bearing against at least a portion of an area surrounding the at least one aperture.

Clause 5: The mounting bracket of clause of any of clauses 1-4, further comprising a plurality of apertures and a corresponding plurality of attachment members configured for insertion through a respective aperture.

Clause 6: The mounting bracket of any of clauses 1-5, wherein the mounting element extends from an upper portion of the base plate, such that when the fall arrest device is attached thereto, wherein the fall arrest device is suspended from the mounting element.

Clause 7: The mounting bracket of any of clauses 1-6, wherein the at least one mounting arrangement comprises a mounting element having a central opening configured to receive at least a portion of the fall arrest device therethrough.

Clause 8: The mounting bracket of any of clauses 1-7, wherein the mounting element comprises at least one aperture extending through the mounting element and configured to receive at least one attachment member therethrough, the at least one attachment member configured to interact with at least one receiving hole extending at least partially in to a first end of at least one spacer member.

Clause 9: The mounting bracket of any of clauses 1-8, wherein the at least one attachment member comprises a threaded bolt and the at least one receiving hole comprises an internal threaded surface configured to interact and mate with the threaded bolt, a head of the bolt bearing against at least a portion of an area surrounding the at least one aperture.

Clause 10: The mounting bracket of clause of any of clauses 1-9, further comprising a plurality of apertures and a corresponding plurality of attachment members configured for insertion through a respective aperture and in to a corresponding plurality of receiving holes extending at least partially in to a first end of a respective one of a plurality of spacer members.

Clause 11: The mounting bracket of any of clauses 1-10, further comprising at least one receiving hole extending at least partially in a second end of the at least one spacer member, wherein at least one attachment member is configured to extend through at least one aperture extending through the base plate, wherein the at least one attachment member directly or indirectly connects the at least one spacer member to the base plate.

Clause 12: The mounting bracket of any of clauses 1-11, wherein the at least one attachment member is configured to extend through an aperture extending through the structure, wherein the at least one attachment member connects the at least one spacer member, the base plate, and the structure.

Clause 13: The mounting bracket of any of clauses 1-12, further comprising a plurality of spacer members configured to space the mounting element from the base plate.

Clause 14: The mounting bracket of any of clauses 1-13, wherein the central opening is substantially circular and configured to at least partially receive a corresponding substantially circular portion of the fall arrest device therethrough.

Clause 15: The mounting bracket of any of clauses 1-14, further comprising at least one bushing member attached to or fitted with the central opening and configured to contact at least a portion of the fall arrest device and reduce vibration of the fall arrest device during operation.

Clause 16: The mounting bracket of any of clauses 1-15, wherein at least one bushing member extends around a perimeter of the central opening.

Clause 17: The mounting bracket of any of clauses 1-16, wherein the at least one bushing member is at least partially formed from at least one of the following: a deformable material, a rubber material, a foam material, a vibration-absorbing material, a damping material, a resilient material, a plastic material, or any combination thereof.

Clause 18: The mounting bracket of any of clauses 1-17, further comprising a retainer area configured to at least partially retain a connector of the fall arrest device with respect to the mounting bracket.

Clause 19: The mounting bracket of any of clauses 1-18, wherein the retainer area comprises an opening extending through at least a portion of the mounting bracket, the opening sized and shaped so as to removably retain the connector.

Clause 20: The mounting bracket of any of clauses 1-19, wherein the at least one device mounting arrangement comprises: a first mounting element attached to or integral with the base plate, wherein the first mounting element comprises at least one attachment arrangement configured to removably attach the fall arrest device to the mounting bracket; and a second mounting element having a central opening configured to receive at least a portion of the fall arrest device therethrough.

Clause 21: A bracket for securing a fall arrest device to a structure, the bracket comprising a first securing means for securing the fall arrest device with respect to the bracket in a first direction and a second securing means for securing the fall arrest device with respect to the bracket in a second direction.

Clause 22: The bracket of clause 21, wherein the first securing means comprises a suspension securing arrangement which is arranged to be positioned above the fall arrest device.

Clause 23: The bracket of clause 21 or 22, wherein the second securing means comprises a front retainer element arranged to be spaced from the structure and extend adjacent to the fall arrest device to retain it in place.

Clause 24: The bracket of any of clauses 21-23, wherein the front retainer element is spaced from a rear portion of the bracket.

Clause 25: The bracket of any of clauses 21-24, wherein the front retainer element is arranged to engage with the fall arrest device in order to assist in holding the fall arrest device in place.

Clause 26: The bracket of any of clauses 21-25, wherein the front retainer element has an opening which is arranged to engage with the fall arrest device to assist in holding it in place.

Clause 27: The bracket of any of clauses 21-26, wherein the front retainer element includes a deformable or resilient engagement element arranged to engage with the fall arrest device to assist it in holding in place.

Clause 28: The bracket of any of clauses 21-27, wherein the front retainer element comprises an annular element defining a substantially circular opening.

Clause 29: The bracket of any of clauses 21-28, wherein the front retainer element is provided with a slot for connecting a connector of a safety line of the fall arrest device to the bracket.

Clause 30: The bracket of any of clauses 21-29, wherein the bracket includes a back element for securing the bracket to the structure having apertures, a front retainer element provided with apertures therein, and a plurality of spacer struts for spacing the front retainer element from the back element; wherein, when assembled, respective apertures in the back element and the front retainer element are aligned coaxially with the spacer struts and bolts secure into opposed ends of respective spacer struts.

Clause 31: A bracket for securing a fall arrest fall arrest device to a structure, the bracket comprising a back element configured to be secured to a structure and a front retainer element spaced from the back element, the front retainer element comprising: a perimeter defining an aperture and configured to abut or engage a housing of the fall arrest device; and/or a resilient, soft, or deformable engagement element and/or; a slot or aperture configured to attach a connector of a safety line of the fall arrest device to the bracket.

Clause 32: The bracket of clause 31, wherein the aperture in the front retainer element further comprises an annular element defining a substantially circular opening.

Clause 33: The bracket of clause 31 or 32, wherein the front retainer element comprises a perimeter defining an aperture, the perimeter including a resilient, soft, or deformable engagement element configured to abut or engage a housing of the fall arrest device.

Clause 34: A bracket for securing a fall arrest device to a structure, the bracket comprising a back element with apertures and configured to be secured to a structure and a front retainer element spaced from the back element, wherein the front retainer element comprises apertures and a plurality of spacer struts for spacing the front retainer element from the back element; and wherein, when assembled, the apertures in the back element and front retainer element are aligned coaxially with the spacer struts, such that they can be secured into opposing ends of respective spacer struts by a plurality of bolts.

Clause 35: A fall arrest system, comprising: a bracket according to any of clauses 1-34; and a fall arrest device.

Clause 36: A mounting bracket for securing a fall arrest device to a structure, the mounting bracket comprising at least one device mounting arrangement directly or indirectly attached to or integral with the structure and configured to secure the fall arrest device to the mounting bracket.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various Figs. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise. Preferred features will be elucidated in the claims and in the specific description of the embodiments that follow. It will be readily appreciated that preferred features of certain aspects or embodiments could be usefully incorporated in other described embodiments even if not specifically described in those terms herein.

DETAILED DESCRIPTION OF THE INVENTION

Figure 1:
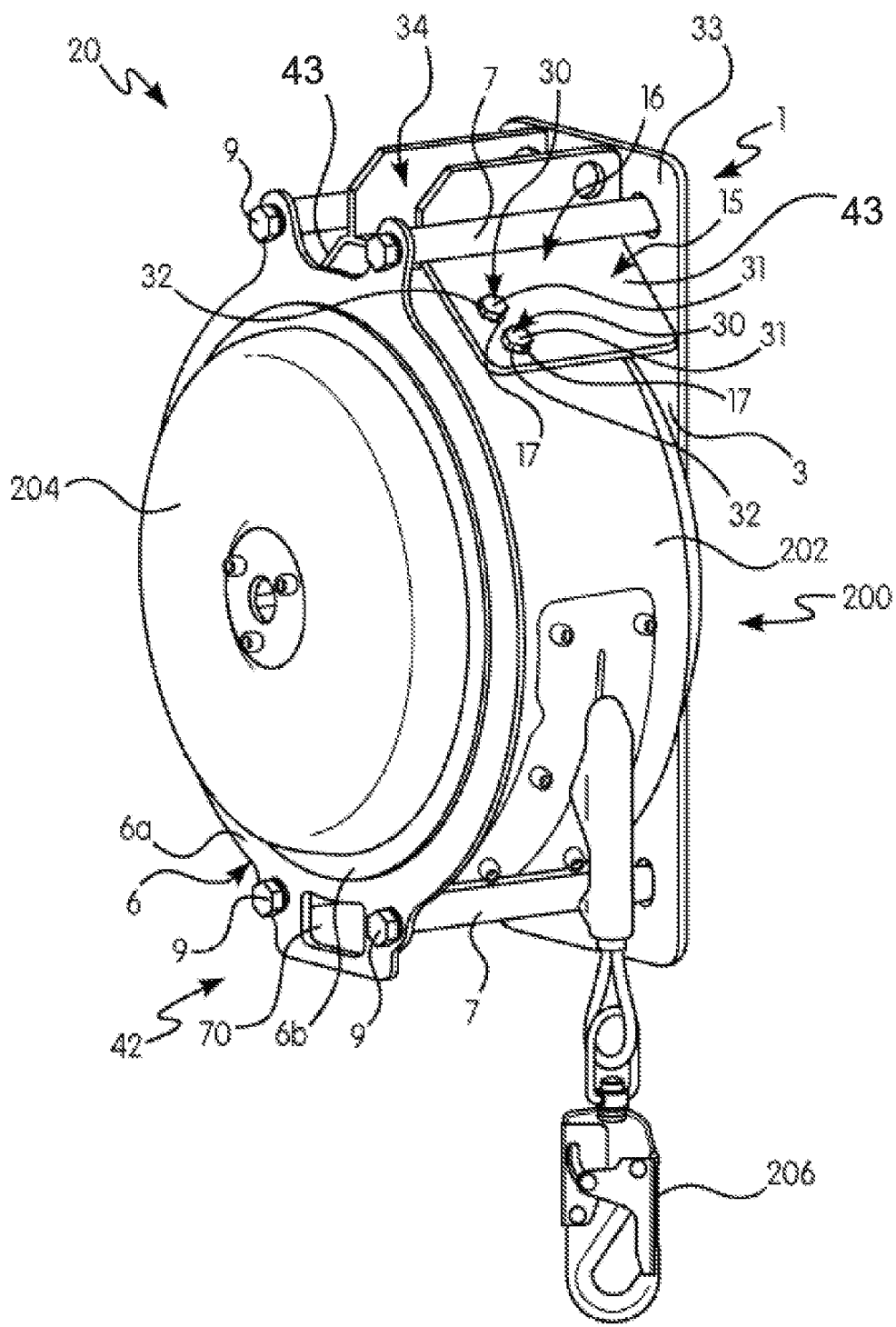
FIG. 1 is a perspective view of one embodiment of a mounting bracket for a fall arrest device, wherein the fall arrest device is attached to the mounting bracket.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing Figs. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

Figure 2:
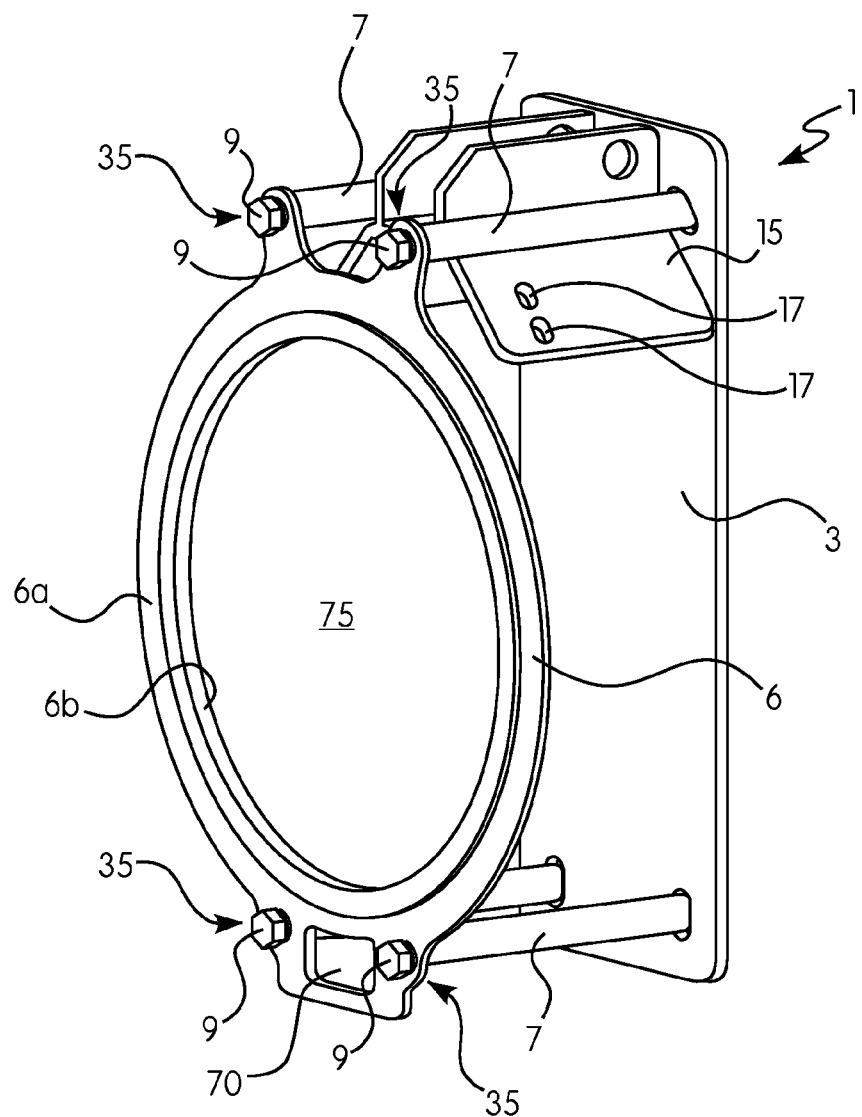
FIG. 2 is a perspective view of the mounting bracket of FIG. 1, wherein the fall arrest device is not attached to the mounting bracket.
Figure 3:
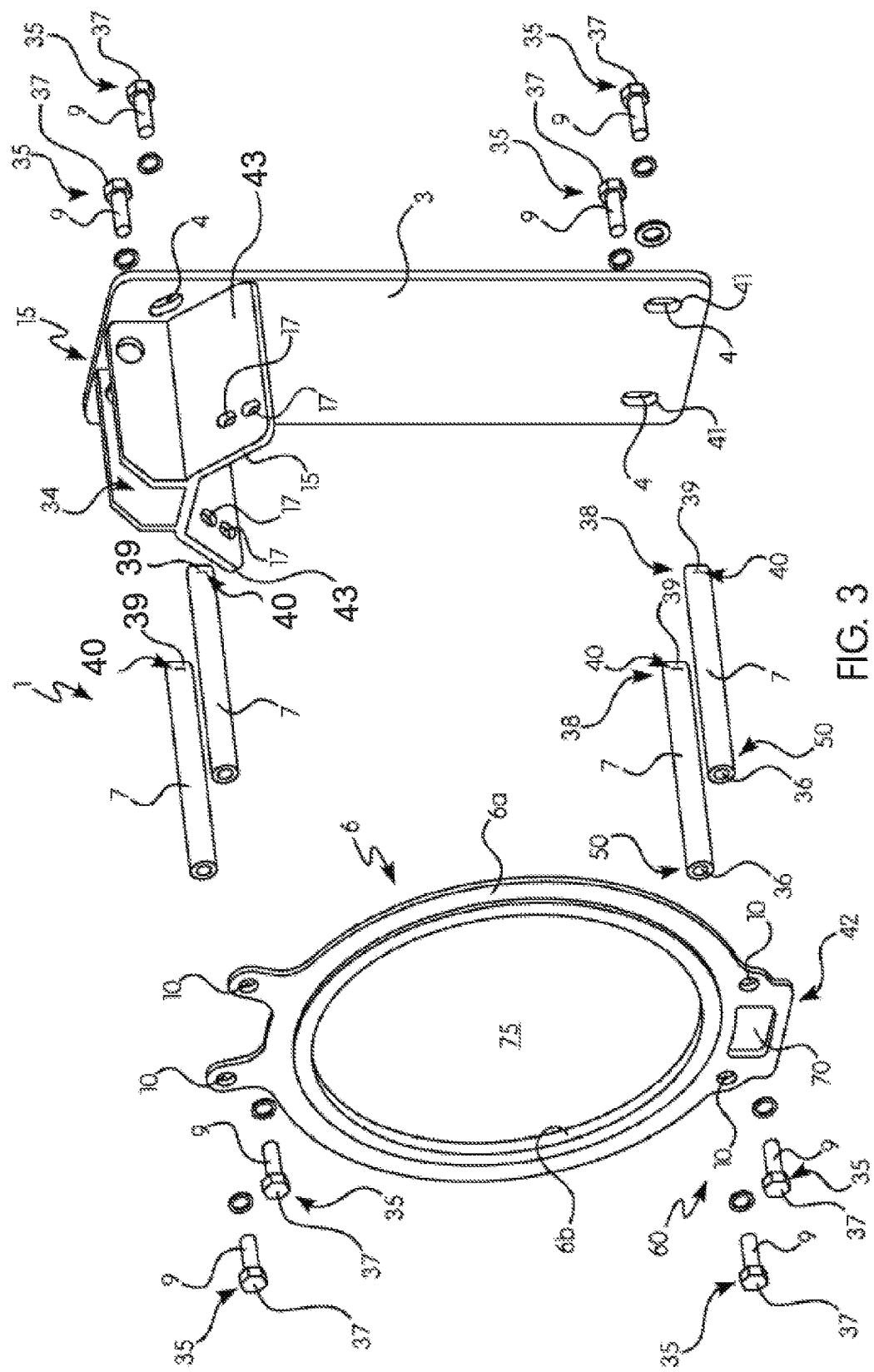
FIG. 3 is an exploded, perspective view of the mounting bracket of FIG. 2.

As illustrated in certain preferred and non-limiting embodiments or aspects in FIGS. 1-3, the present invention is directed to a mounting bracket 1 for use in mounting or securing a fall arrest device 200 (e.g., a fall protection device, a self-retracting lanyard, a safety device, and the like) to a secure point, such a surface of a structure (not shown). It is envisioned that the mounting bracket 1 can be configured, arranged, or modified to interact with a variety of makes and models of fall arrest devices 200 without departing from the spirit and scope hereof.

According to one preferred and non-limiting embodiment or aspect, and with specific reference to FIGS. 2 and 3, the mounting bracket 1 includes a base plate 3, which is shaped or configured for attachment to a portion of the structure, e.g., a flat surface, a rail, a beam, and the like. While, in the illustrated embodiment, the base plate 3 is a substantially flat piece, any shape or structure may be used so that the base plate 3 can be effectively and safely secured or attached to the structure. In this embodiment, the mounting bracket 1 includes at least one device mounting arrangement 20 that is attached to or integral with the base plate 3. This at least one device mounting arrangement 20 is configured to mount or secure the fall arrest device 200 to or with respect to the mounting bracket 1.

In one preferred and non-limiting embodiment or aspect, the at least one device mounting arrangement 20 is in the form of a mounting element 15 that is attached to or integral with the base plate 3. In the illustrated embodiment, the mounting element 15 is in the form of a shaped piece that is attached (e.g., welded) to or integrally formed with the base plate 3. The mounting element 15 includes at least one attachment arrangement (or configuration) 16 configured to removably attach the fall arrest device 200 to the mounting bracket 1. For example, as best illustrated in FIGS. 1 and 2, and in one preferred and non-limiting embodiment or aspect, the attachment arrangement 16 includes at least one aperture 17 extending through the mounting element 15 and configured to receive at least one attachment member 30 therethrough. The attachment member 30 is configured to interact with at least one receiving hole (not shown) extending at least partially into at least a portion of the fall arrest device 200. In another preferred and non-limiting embodiment or aspect, the mounting element 15 is attached directly to or integrally formed with the structure, such that the base plate 3 is not required.

In one preferred and non-limiting embodiment or aspect, the at least one attachment member 30 is in the form of a threaded bolt 31, and the at least one receiving hole extending into the fall arrest device 200, such as an external housing 202 of the fall arrest device 200, has an internal threaded surface (not shown) that is sized, shaped, or configured to interact and mate with the threaded bolt 31. When attached, a head 32 of the bolt 31 abuts and/or bears against at least a portion of an area of the mounting element 15 surrounding the at least one aperture 17. In another preferred and non-limiting embodiment or aspect, the mounting element 15 includes a plurality of apertures 17 and a corresponding plurality of attachment members 30, e.g., bolts 31, configured for insertion through a respective aperture 17. Using the attachment members 30, the fall arrest device 200 is removably and securely fixed to the mounting element 15 (and, thereby, the mounting bracket 1) and supported (and/or suspended) in a first direction.

In a further preferred and non-limiting embodiment or aspect, the mounting element 15 extends from an upper portion 33 of the base plate 3, such that when the fall arrest device 200 is attached thereto, the fall arrest device 200 is suspended from the mounting element 15. Further, and based upon the generally rounded surface of the housing 202 of the fall arrest device 200, the mounting element 15 may be a shaped component with a central portion 34 and two slanted contact portions 43. In this manner, there is an increased number of contact points for securing the fall arrest device 200 to the mounting element 15. In another preferred and non-limiting embodiment or aspect, each of the contact portions 43 include a plurality of apertures 17 extending therethrough, which are configured to receive a respective plurality of attachment members 30 for passage into corresponding receiving holes in the housing 202 of the fall arrest device 200. This provides for the secure and releasable connection of the fall arrest device 200 to the mounting bracket 1.

In one preferred and non-limiting embodiment or aspect, the at least one mounting arrangement 20 includes a mounting element 6 having a perimeter portion 6a defining a central opening 75 (see, e.g., FIGS. 2 and 3) that is sized, shaped, or configured to receive at least a portion (such as an extension portion 204 of the housing 202) of the fall arrest device 200 therethrough. In another preferred and non-limiting embodiment or aspect, and as illustrated in FIGS. 1 and 2, the perimeter portion 6a defines a central opening 75 that is substantially circular and sized, shaped, or configured to at least partially receive a correspondingly substantially circular portion (e.g., extension portion 204) of the fall arrest device 200 therethrough.

In use, when the fall arrest device 200 is mounted in the mounting bracket 1, and by positioning the extension portion 204 of the fall arrest device 200 through the central opening 75, the fall arrest device is secured in a second direction that is substantially perpendicular to the first direction discussed above in connection with the mounting element 15. It is also envisioned that the extension portion 204 may be any part of the fall arrest device 200 and/or housing 202 of the fall arrest device 200, such that various structural configurations of fall arrest devices 200 may be utilized in connection with the mounting bracket 1. One benefit of having the extension portion 204 extending through the central opening 75 is that access to the housing 202 (and, thereby, the internal components) of the fall arrest device 200 is provided. This may also permit a person to view the housing 202, such as the safety information attached to or printed on the housing 202 of the fall arrest device 200.

In another preferred and non-limiting embodiment, the mounting element 6, and in particular the perimeter portion 6a and/or the at least one bushing 6b do not engage or abut any portion of the fall arrest device 200. For example, the mounting element 6 may act as an arrangement to attach the mounting bracket 1 to the structure (via the at least one spacer member 7). In another example, while a portion of the fall arrest device 200 may extend at least partially through the central opening 75, and may not engage or abut the mounting element 6, such an arrangement may provide a secondary retaining feature if the fall arrest device 200 becomes detached from the mounting element 6 in the case of a fall event (or other event that results in detachment of the fall arrest device 200). It is further envisioned that the primary attachment may occur using the mounting element 6, where the mounting element 15 is not engaged with the fall arrest device 200. In another preferred and non-limiting embodiment or aspect, the mounting element 6, such as the at least one spacer member 7, is attached directly to or integrally formed with the structure, such that the base plate 3 is not required.

In another preferred and non-limiting embodiment or aspect, and as best shown in FIG. 3, the mounting element 6 includes an attachment arrangement 60 including at least one aperture 10 extending through a surface of the mounting element 6. The at least one aperture 10 is sized, shaped, or configured to receive at least one attachment member 35 therethrough, and, as illustrated in FIG. 3, the attachment member 35 may be in the form of a threaded bolt 9. This bolt 9 is configured to interact with at least one receiving hole 36 extending into a first end 50 of a spacer member 7. In particular, the at least one receiving hole 36 includes an internal threaded surface that is sized, shaped, and configured to interact and mate with the threaded bolt 9. When attached, a head 37 of the bolt 9 abuts and/or bears against at least a portion of an area of the mounting element 6 surrounding the at least one aperture 10.

In another preferred and non-limiting embodiment or aspect, the attachment arrangement 60 includes a plurality of apertures 10 and a corresponding plurality of attachment members 35, e.g., bolts 9, configured for insertion through a respective aperture 10 and into a respective receiving hole 36 of a spacer member 7. Using the attachment members 35, the mounting element 6 is removably and securely fixed to the first ends 50 of the spacer members 7. In another preferred and non-limiting embodiment or aspect, a second end 38 of the at least one spacer member 7 is shaped to be at least partially inserted into at least one aperture 4 extending through the base plate 3. As illustrated in FIG. 3, the shaped second end 38 may include a insertion projection 39 and a shoulder 40, wherein the insertion projection 39 is sized, shaped, or configured to pass into and/or through the at least one aperture 4 (which also may be correspondingly shaped or oriented) until the shoulder 40 bears against an outer surface 41 defining the at least one aperture 4. In this manner, the at least one spacer member 7 is fixed and non-rotatable with respect to the base plate 3. A plurality of apertures 4 and corresponding spacer members 7 can be used. This arrangement spaces the mounting element 6 from the base plate 3, wherein the fall arrest device 200 is mounted in the mounting bracket 1 in a second direction.

With continued reference to FIG. 3, and in one preferred and non-limiting embodiment, the second end 38 of the at least one spacer member 7 may include a receiving hole with a threaded internal surface, such that an attachment member 35, such as a threaded bolt 9, can be removably connected within the receiving hole. In one embodiment or aspect, the head 37 of the bolt 9 abuts and/or bears against at least a portion of an area of the base plate 3 surrounding the at least one aperture 4, thereby attaching the second end 38 of the at least one spacer member 7 to the base plate 3. In a further preferred and non-limiting embodiment, the at least one attachment member 35, such as the bolt 9, extends through an aligned and corresponding aperture of the structure (e.g., a railing, a plate, a wall, and the like) to which the mounting bracket 1 is to be attached. Accordingly, the bolt 9 is inserted through the aperture in the structure, through the at least one aperture 4 of the base plate 3, and threaded into the receiving hole in the second end 38 of the at least one spacer member 7. In this manner, the mounting bracket 1 is securely and removably connected to the structure.

In another preferred and non-limiting embodiment or aspect, the mounting bracket 1 further includes at least one bushing member 6b that is attached to or fitted with the perimeter portion 6a and the central opening 75. This at least one bushing member 6b is sized, shaped, or configured to contact at least a portion (e.g., the extension portion 204) of the fall arrest device 200 and: (1) grip and retain the fall arrest device 200 within the central opening 75; and/or (2) reduce or damp vibration of the fall arrest device 200 during operation. This damping assists in reducing the chance of any of the attachment arrangements or bolts from loosening, such as may occur based upon weather conditions or during transport of a structure having the mounting bracket 1 and fall arrest device 200 attached thereto. In another preferred and non-limiting embodiment or aspect, the at least one bushing member 6b extends around the entire perimeter of the central opening 75. In another preferred and non-limiting embodiment or aspect, the at least one bushing member 6b is at least partially formed from at least one of the following: a deformable material, a rubber material, a foam material, a vibration-absorbing material, a damping material, a resilient material, a plastic material, or any combination thereof.

In one preferred and non-limiting embodiment or aspect, the mounting bracket 1 further includes a retainer area 42 that is sized, shaped, or configured to at least partially retain a connector 206 of the fall arrest device 200 with respect to the mounting bracket 1. In another preferred and non-limiting embodiment or aspect, this retainer area 42 is in the form of an opening 70 extending through at least a portion of the mounting bracket 1 (e.g., a portion of the mounting element 6), wherein the opening 70 is sized, shaped, or configured so as to removably retain the connector 206. This permits the user to store the connector 206, as opposed to allowing it to dangle, when the fall arrest device 200 is not in use. Further, this prevents damage to the mounting bracket 1 and/or the fall arrest device 200 during adverse weather conditions and/or transport of the structure. In one preferred and non-limiting embodiment or aspect, the opening 70 extends through the perimeter portion 6a of the mounting element 6, such that it is stored away from the base plate 3 of the mounting bracket 1 and the structure to which the mounting bracket 1 is secured.

In one preferred and non-limiting embodiment or aspect, the at least one device mounting arrangement 20 includes both the mounting element 15 and the mounting element 6. Such an arrangement secures the fall arrest device 200 to and within the mounting bracket 1 in two directions, where the fall arrest device 200 is attached to and suspended from the mounting element 15, i.e., the first direction, and sandwiched between the mounting element 6 and the base plate 3, i.e., the second direction, which is substantially perpendicular to the first direction.

In this manner, provided is an improved mounting bracket 1 for use in connection with a fall arrest device 200.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. A mounting bracket for securing a fall arrest device to a structure, the mounting bracket comprising:
    a base plate configured for attachment to the structure; and
    at least one device mounting arrangement attached to or integral with the base plate and configured to secure the fall arrest device to the mounting bracket, wherein the at least one device mounting arrangement comprises at least two contact portions that are slanted relative to one another,
    wherein the at least one device mounting arrangement comprises a mounting element having a central opening configured to receive at least a portion of the fall arrest device therethrough,
    wherein the at least one device mounting arrangement comprises the mounting element attached to or integral with the base plate, wherein the mounting element comprises at least one attachment arrangement configured to removably attach the fall arrest device to the mounting bracket,
    wherein the mounting element extends from an upper portion of the base plate, such that when the fall arrest device is attached thereto, the fall arrest device is suspended from the mounting element, and
    wherein the mounting element comprises at least one first aperture extending through the mounting element and configured to receive at least one attachment member therethrough, the at least one attachment member configured to interact with at least one receiving hole extending at least partially in to a first end of at least one spacer member.

2. The mounting bracket of claim 1, wherein the attachment arrangement comprises at least one second aperture extending through the mounting element and configured to receive at least one attachment member therethrough, the at least one attachment member configured to interact with at least one receiving hole extending at least partially in to at least a portion of the fall arrest device.

3. The mounting bracket of claim 2, wherein the at least one attachment member comprises a threaded bolt and the at least one receiving hole comprises an internal threaded surface configured to interact and mate with the threaded bolt, a head of the bolt bearing against at least a portion of an area surrounding the at least one second aperture.

4. The mounting bracket of claim 2, further comprising a plurality of apertures and a corresponding plurality of attachment members configured for insertion through a respective aperture.

5. The mounting bracket of claim 1, wherein the at least one attachment member comprises a threaded bolt and the at least one receiving hole comprises an internal threaded surface configured to interact and mate with the threaded bolt, a head of the bolt bearing against at least a portion of an area surrounding the at least one first aperture.

6. The mounting bracket of claim 1, further comprising a plurality of apertures and a corresponding plurality of attachment members configured for insertion through a respective aperture and in to a corresponding plurality of receiving holes extending at least partially in to a first end of a respective one of a plurality of spacer members.

7. The mounting bracket of claim 1, further comprising at least one receiving hole extending at least partially in a second end of the at least one spacer member, wherein at least one attachment member is configured to extend through at least one aperture extending through the base plate, wherein the at least one attachment member directly or indirectly connects the at least one spacer member to the base plate.

8. The mounting bracket of claim 7, wherein the at least one attachment member is configured to extend through an aperture extending through the structure, wherein the at least one attachment member connects the at least one spacer member, the base plate, and the structure.

9. The mounting bracket of claim 8, further comprising a plurality of spacer members configured to space the mounting element from the base plate.

10. The mounting bracket of claim 1, wherein the central opening is substantially circular and configured to at least partially receive a corresponding substantially circular portion of the fall arrest device therethrough.

11. The mounting bracket of claim 1, further comprising at least one bushing member attached to or fitted with the central opening and configured to contact at least a portion of the fall arrest device and reduce vibration of the fall arrest device during operation.

12. The mounting bracket of claim 11, wherein at least one bushing member extends around a perimeter of the central opening.

13. The mounting bracket of claim 11, wherein the at least one bushing member is at least partially formed from at least one of the following: a deformable material, a rubber material, a foam material, a vibration-absorbing material, a damping material, a resilient material, a plastic material, or any combination thereof.

14. The mounting bracket of claim 1, further comprising a retainer area configured to at least partially retain a connector of the fall arrest device with respect to the mounting bracket.

15. The mounting bracket of claim 14, wherein the retainer area comprises an opening extending through at least a portion of the mounting bracket, the opening sized and shaped so as to removably retain the connector.

16. The mounting bracket of claim 1, wherein the at least one device mounting arrangement comprises:
a first mounting device attached to or integral with the base plate, wherein the first mounting device comprises at least one attachment arrangement configured to removably attach the fall arrest device to the mounting bracket; and
a second mounting device having a central opening configured to receive at least a portion of the fall arrest device therethrough.

* * * * *